United States Patent
Todderud et al.

(10) Patent No.: US 11,503,766 B2
(45) Date of Patent: Nov. 22, 2022

(54) TENSIONING DEVICE FOR AN AGRICULTURAL MACHINE

(71) Applicant: CNH Industrial America LLC, New Holland, PA (US)

(72) Inventors: Stephen Todderud, Lancaster, PA (US); Jeff Thomas, Gordonville, PA (US); Blaine R. Noll, Fleetwood, PA (US); Benjamin Kemmerer, Hamburg, PA (US); Kevin Ward, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/186,535

(22) Filed: Feb. 26, 2021

(65) Prior Publication Data
US 2022/0272901 A1 Sep. 1, 2022

(51) Int. Cl.
*A01D 57/20* (2006.01)
*B65G 23/44* (2006.01)
*A01D 61/02* (2006.01)

(52) U.S. Cl.
CPC ............. *A01D 57/20* (2013.01); *A01D 61/02* (2013.01); *B65G 23/44* (2013.01)

(58) Field of Classification Search
CPC ......... A01D 57/20; A01D 61/02; B65G 23/44
USPC .................................................. 198/813–816
See application file for complete search history.

(56) References Cited

U.S. PATENT DOCUMENTS

| | | | |
|---|---|---|---|
| 5,389,045 A * | 2/1995 | Lyons | F16H 7/14 474/113 |
| 6,202,397 B1 | 3/2001 | Watts et al. | |
| 6,679,038 B2 | 1/2004 | Walch | |
| 8,573,388 B2 | 11/2013 | Hoffman et al. | |
| 8,919,540 B2 * | 12/2014 | Slavov | B65G 23/44 198/815 |
| 9,144,197 B2 | 9/2015 | Gahres | |
| 9,221,617 B2 * | 12/2015 | Waller | B65G 23/44 |
| 9,388,693 B2 * | 7/2016 | Whelan | B65G 21/14 |
| 10,257,981 B2 | 4/2019 | Allochis | |
| 11,266,070 B2 * | 3/2022 | Sorensen | A01D 61/02 |
| 2016/0360699 A1 * | 12/2016 | Allochis | A01D 57/20 |
| 2021/0147152 A1 * | 5/2021 | Cook | A01D 41/12 |
| 2021/0163229 A1 * | 6/2021 | Cook | A01D 57/20 |

* cited by examiner

*Primary Examiner* — Mark A Deuble
(74) *Attorney, Agent, or Firm* — Peter Zacharias; Patrick Sheldrake

(57) ABSTRACT

A header for a combine harvester includes a conveyor belt for conveying crop material in a conveyance direction, and an adjusting device for adjusting a tension of the conveyor belt. The adjusting device includes a cable that is movable with respect to a frame member of the header. A portion of the cable that is either directly or indirectly attached to one end of a roller for the conveyor belt extends either parallel to or substantially parallel to a tensioning direction of the conveyor belt for adjusting the tension of the conveyor belt. The conveyor belt may be an infeed conveyor belt or a lateral conveyor belt of a draper header, for example.

18 Claims, 7 Drawing Sheets

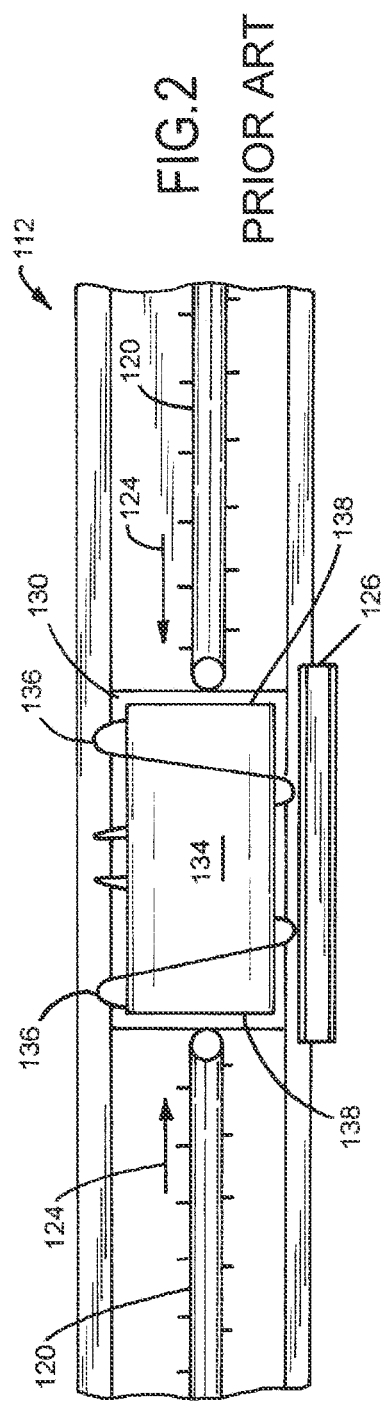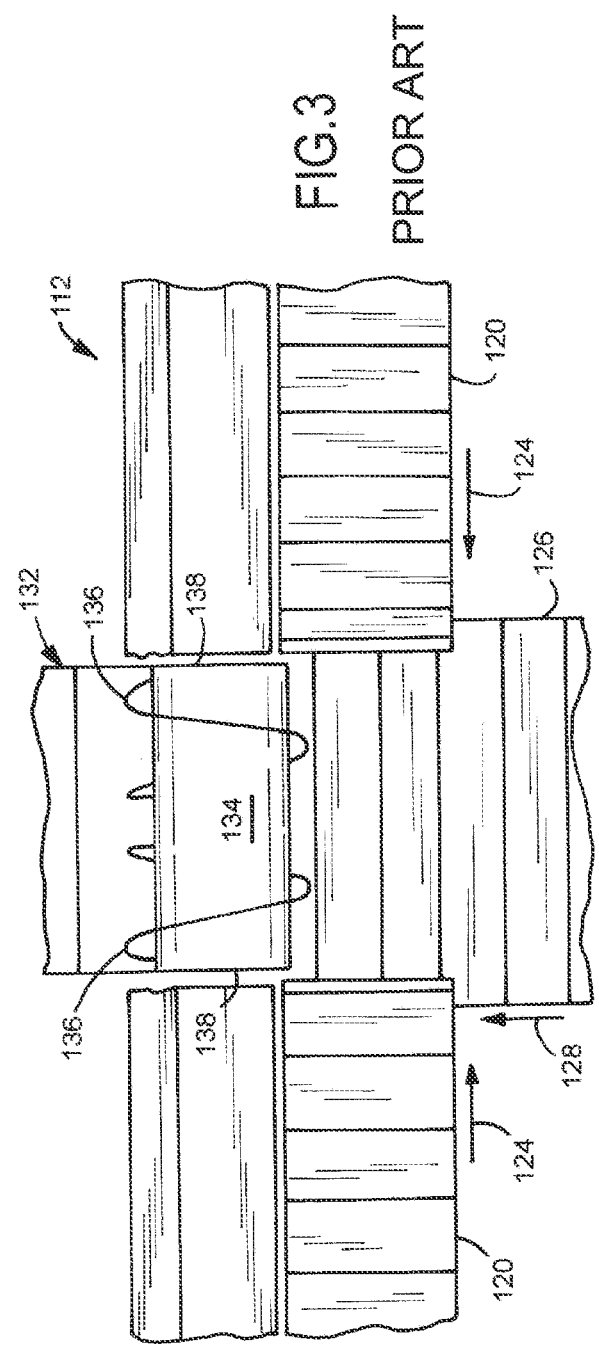

US 11,503,766 B2

TENSIONING DEVICE FOR AN AGRICULTURAL MACHINE

FIELD OF THE INVENTION

The present invention relates generally to a tensioning device for an agricultural machine, such as a combine, and specifically to a header of a combine, and more specifically to a device for tensioning an infeed belt of the header.

BACKGROUND OF THE INVENTION

As is described in U.S. Pat. No. 9,144,197 to CNH America LLC, which is incorporated by reference herein in its entirety and for all purposes, a typical header of an agricultural combine includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For instance, the header may include a rotating reel with tines or the like to sweep the crop material towards the cutter(s).

A draper header is typically used to harvest fluffy or bushy crop material such as soy beans or canola. A draper header generally includes a conveyor that is in the form of one or more flat belts, known as draper belts, to convey the crop material to the feeder housing. Typically, a draper header may include two lateral draper belts that convey the crop material longitudinally inward and a center feed belt that conveys the crop material into the feeder housing. Each draper belt may be wrapped around rollers, for example, various combinations of drive rollers and idler rollers. The draper belts may include cleats extending transversely across the full width of the header, which contact the crop material to help facilitate its transportation into the feeder housing.

It can be necessary to adjust the tension on the belts of the header. Current methods for adjusting the tension on the belts are challenging due to difficulties in accessing the belt adjustment components.

Thus, it would be advantageous to provide a convenient and simple method for adjusting the tension on the belt of a draper header of an agricultural vehicle.

SUMMARY OF THE INVENTION

According to one aspect of the invention, a header for a combine harvester comprises a conveyor belt for conveying crop material in a conveyance direction; and an adjusting device for adjusting a tension of the conveyor belt, the adjusting device comprising a cable that is movable with respect to a frame member of the header, wherein a first attachment portion of the cable is either directly or indirectly attached to one end of a roller for the conveyor belt, and wherein the first attachment portion extends either parallel to or substantially parallel to a tensioning direction of the conveyor belt for adjusting the tension of the conveyor belt.

According to another aspect of the invention, a header for a combine harvester comprises a roller; a conveyor belt mounted to the roller for conveying crop material in a conveyance direction; and an adjusting device for adjusting a tension of the conveyor belt, the adjusting device comprising a cable assembly that is movable with respect to a frame member of the header, the cable assembly comprising a first cable and a second cable. A first attachment portion of the first cable of the cable assembly is either directly or indirectly attached to one end of the roller. A first attachment portion of the second cable of the cable assembly is either directly or indirectly attached to an opposite end of the roller for the conveyor belt. The first attachment portions each extend either parallel to or substantially parallel to a tensioning direction of the conveyor belt for adjusting the tension of the conveyor belt.

According to another aspect of the invention, an adjusting device for adjusting a tension of the conveyor belt is provided. The adjusting device comprising a cable that is movable with respect to a frame member, wherein a first attachment portion of the cable is either directly or indirectly attached to one end of a roller for the conveyor belt, and wherein the first attachment portion extends either parallel to or substantially parallel to a tensioning direction of the conveyor belt for adjusting the tension of the conveyor belt.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a partial schematic front elevation view of a header for an agricultural harvester.

FIG. 3 is a partial schematic top plan view of the header of FIG. 2.

DETAILED DESCRIPTION OF THE INVENTION

Figure 1:
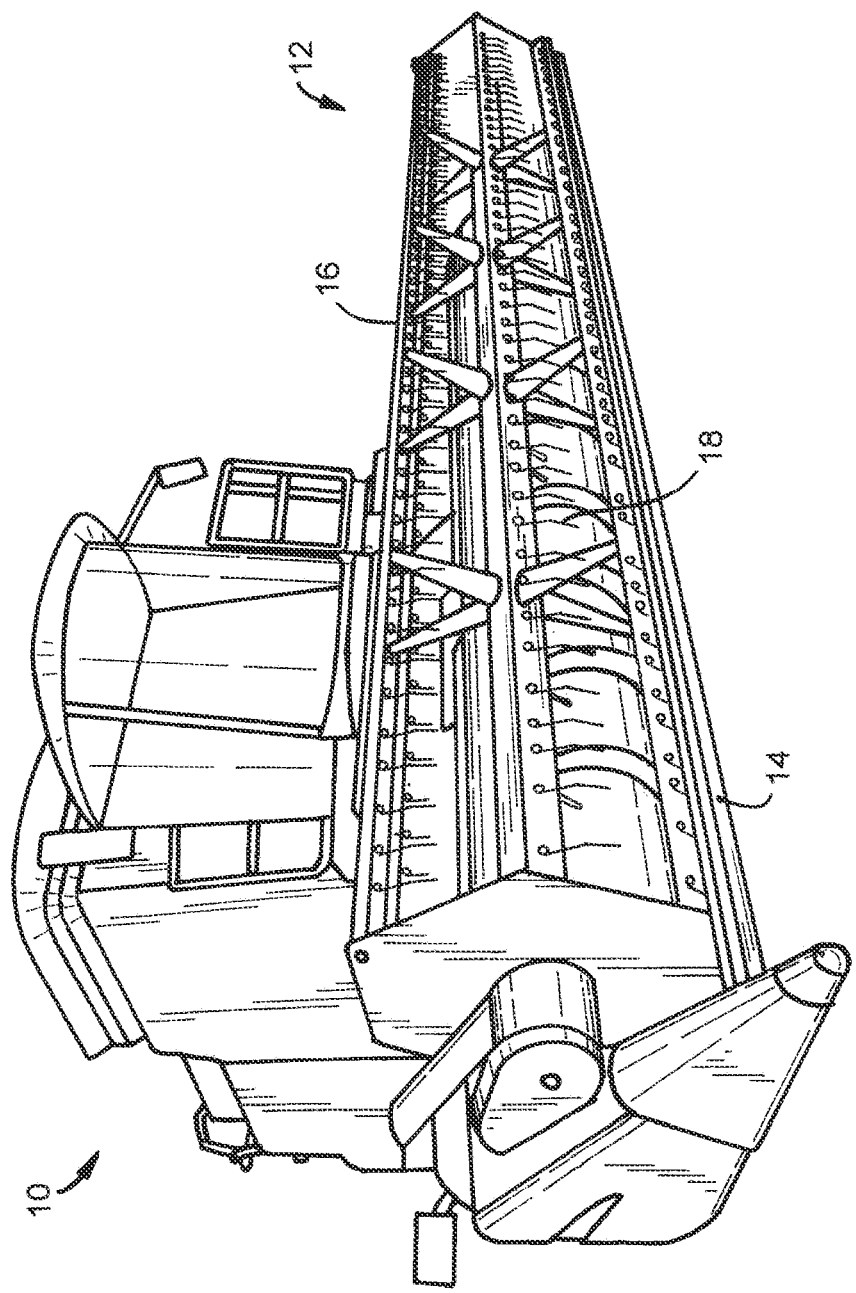
FIG. 1 is a perspective view of an agricultural harvester including a header.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Referring now to the drawings, as is described in U.S. Pat. No. 9,144,197, FIG. 1 illustrates an agricultural harvester applicable to the subject application in the form of a combine harvester 10 to which is attached a header 12. The header 12 has a crop cutter or knife assembly 14 arranged close the ground. The knife assembly can include a stationary blade and a reciprocating blade which together act as shears that cut the crop near the ground. A harvesting reel 16 having tines 18 rotates about a horizontal axis adjacent to the knife assembly 14 to gather the cut crop and feed it into unillustrated processing machinery of the harvester.

Figure 4:
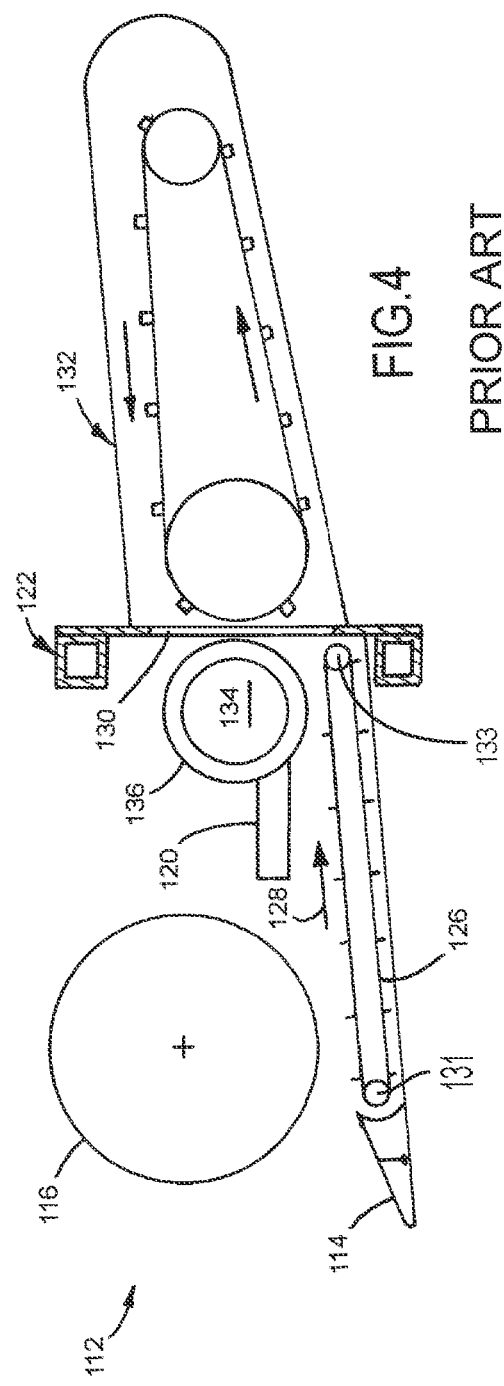
FIG. 4 is a schematic elevational cross-section view taken along a centerline of the header.

Turning to FIGS. 2 through 4, there are shown several views of a draper header 112 for use with the combine harvester 10 in place of the header 12. The header 112 includes a crop cutter and harvesting reel 116 (FIG. 4) followed rearwardly by a crop or grain conveyor system. The harvesting reel 116 gathers the crop cut by the crop cutter 114 and delivers the cut crop to a conveyor system. The conveyor system typically includes a header conveyor constructed as a pair of opposed, laterally extending conveyors 120 which extend from the lateral ends of the header frame or chassis 122 (shown in cross-section in FIG. 4) toward a generally central region of the chassis. As indicated by arrows 124 of FIGS. 2 and 3, cut crop is delivered by conveyors 120 toward a centrally located infeed conveyor 126. Infeed conveyor 126 may also be referred to herein as a belt or conveyor belt. Infeed conveyor 126 extends substantially perpendicular to conveyors 120 and is driven by a belt drive shaft 131 to move crop in the direction of arrows 128 toward an outlet 130 (FIGS. 2 and 4) which leads to a feederhouse 132. As seen in FIGS. 2 through 4, before reaching outlet 130, the cut crop first encounters a centrally located rotatable infeed auger 134 which impels the crop or grain through the outlet 130. More specifically, the cut crop is engaged by the helical vanes or flights 136 of the infeed auger 134 and is pushed thereby through outlet 130.

It has been observed that conventional infeed conveyors suffer certain disadvantages. As noted above, it can be necessary to adjust the tension on the conventional infeed conveyor. Current methods for adjusting the tension on a conventional infeed conveyor are challenging due to difficulties in accessing the belt adjustment components. The devices shown in FIGS. 5-10 are effective in remedying those difficulties.

Figure 5:
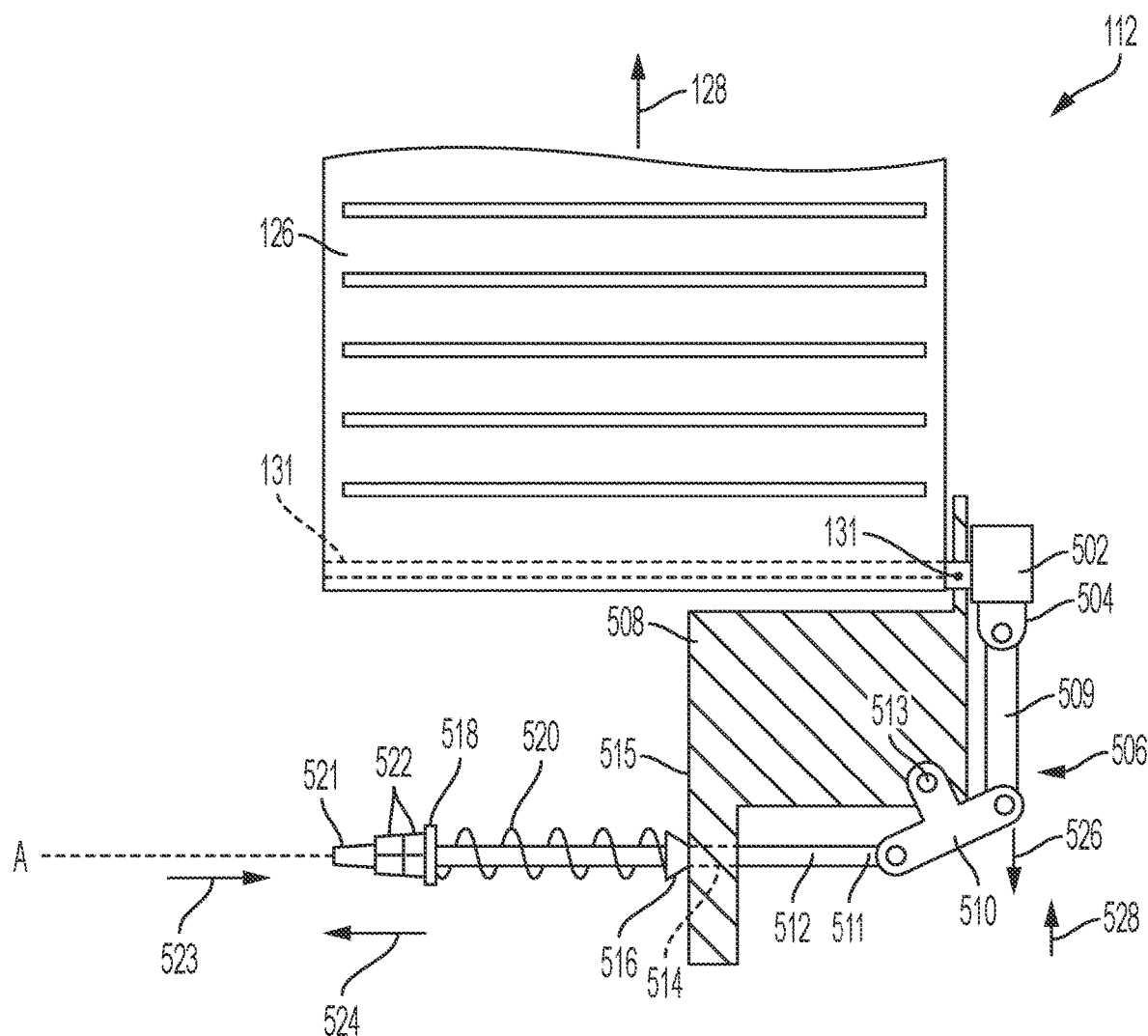
FIG. 5 is another partial schematic top plan view of the header of FIG. 2.

FIG. 5 is another partial schematic top plan view of the header of FIG. 2. FIG. 5 depicts the infeed conveyor 126, which is moved in the direction of arrow 128 by a belt drive shaft 133. The other end of the infeed conveyor 126 is wrapped around a belt idler shaft 131, which may also be referred to herein as a roller or shaft. The belt idler shaft 131 may extend along the entire width of the conveyor 126, as shown. Alternatively, the shaft 131 may extend along only a portion of the conveyor 126. The end of the shaft 131 is journaled in a bearing 502. Bearing 502 has an integral flange 504 extending therefrom or bearing 502 is in a housing. A linkage 506 is connected between flange 504 of bearing 502 and a frame member 508 of header 112. Frame member 508 is a stationary component of header 112, and may comprise more than one stationary component. More particularly, frame member 508 is stationary at least with respect to the belt of the infeed conveyor 126. The infeed conveyor 126 may be able to pivot with respect to the frame of the header.

Linkage 506 comprises a first link 509 that is pivotably connected to flange 504 by a pinned connection. The opposite end of first link 509 is pivotably connected to one leg of a joint 510 by a pinned connection. Joint 510 forms part of linkage 506, and may be referred to in the art as a clevis. A proximal end 511 (i.e., proximal to joint 510) of a second link 512 is pivotably connected to another leg of joint 510 by a pinned connection. A third leg of joint 510 is pivotably connected to frame member 508 by a pinned connection 513.

Second link 512 of linkage 506 passes through an opening 514 formed in frame member 508 and is configured to translate within opening 514, as will be described later. A conical washer 516 is slideably positioned over link 512. Link 512 is capable of translating with respect to conical washer 516. Conical washer 516 includes a conical end that faces and engages with opening 514 on a side 515 of frame member 508. It should be understood that washer 516 is not fixed to frame member 508 or link 512. A flat washer 518 is also slideably positioned over link 512 and is spaced at a distance from conical washer 516. A compression spring 520 is positioned over link 512 and between conical washer 516 and flat washer 518. It should be understood that link 512 is positioned through opening 514, washers 516 and 518, and compression spring 520. The distal end 521 of link 512 is threaded for receiving two threaded fasteners 522 (e.g., nuts).

Those skilled in the art will recognize that other fastening arrangements exist other than nuts and threads. For example, link 512 may include a series of holes staggered along its length and perpendicular to the longitudinal axis "A" for receiving one or more pins therethrough. As another alternative, a clamp may be mounted to the outer diameter of link 512. As another alternative, link 512 may include a series of holes staggered along its length and perpendicular to the longitudinal axis "A" for receiving one or more threaded screws.

Referring still to FIG. 5, adjusting the position of the fasteners 522 changes the tension on conveyor belt 126. For example, moving the fasteners 522 further toward frame member 508 (in the direction of arrow 523) causes compression of spring 520, which causes the link 512 to translate in the direction of arrow 524, which causes joint 510 to rotate about pinned connection 513 in a clockwise direction, which causes link 509 to translate in the direction of arrow 526, which causes bearing 502 and shaft 131 to move in the direction of arrow 526. Movement of shaft 131 in the direction of arrow 526 increases the tension on conveyor belt 126. Link 509 pulls on the center axis of bearing 502, which limits a moment being applied to bearing 502 and shaft 131. Unlike conventional belt tensioning systems, spring 520 and link 512 translate or move in a direction that is perpendicular or substantially perpendicular to the direction 526 of belt tensioning. Stated differently, spring 520 and link 512 translate in a transverse direction with respect to the combine.

Conversely, moving the fasteners 522 further away from frame member 508 (in the direction of arrow 524) causes expansion of spring 520, which causes the link 512 to translate in the direction of arrow 523, which causes joint 510 to rotate about pinned connection 513 in a counter-clockwise direction, which causes link 509 to translate in the direction of arrow 528, which causes bearing 502 and shaft 131 to move in the direction of arrow 528. Movement of shaft 131 in the direction of arrow 528 decreases the tension on conveyor belt 126.

A user accessible cover (not shown) may be provided on an exterior surface of header 122 for accessing the fasteners 522. The position of fasteners 522 is readily accessible to an operator of header 122, unlike conventional belt tensioning systems.

Figure 6:
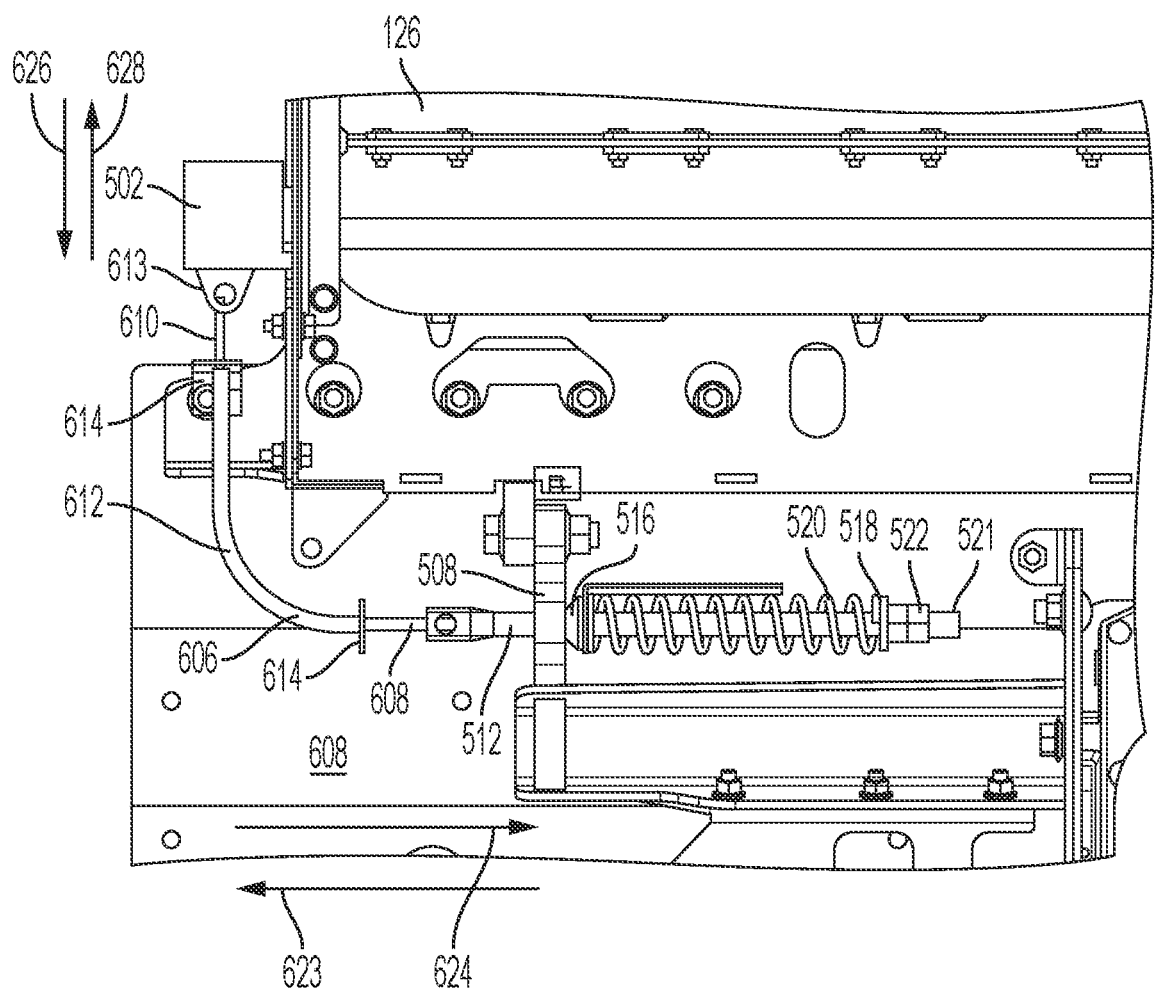
FIG. 6 is a partial schematic top plan view of a header according to a second example.

FIG. 6 is a partial schematic top plan view of a header according to a second example. The header of FIG. 6 is substantially similar to the header of FIG. 5, with the exception that the header of FIG. 6 includes a cable 606 in lieu of the linkage 506 for adjusting the level of tension of bearing 502 of the idler shaft 131. Also, as compared with FIG. 5, the cable 606 provides a tension force to the opposite end of the bearing 502 of the idler shaft 131. Lastly, the stationary frame member 508 has a different appearance in FIG. 6, however, it is functionally equivalent to the stationary frame member 508 shown in FIG. 5.

The cable 606 extends between two ends 608 and 610. The ends may also be referred to herein as attachment portions. The first end 608 of the cable 606 is fixed to the link 512. The end of the link 512 includes an opening for receiving the first end 608. The first end 608 is pinned, crimped, tied, clamped, fastened, or is otherwise fixed to the end of the link 512. Similarly, the second end 610 is tied, pinned, crimped, clamped, fastened, or is otherwise fixed to an opening provided on a flange 613 of the bearing 502. The second end 610 is oriented either parallel or substantially parallel (e.g., within twenty degrees) to the tensioning direction 626/628 of the conveyor belt 126, wherein the first end 608 is either perpendicular or substantially perpendicular (e.g., within twenty degrees) to the tensioning direction 626/628 of the conveyor belt 126.

The cable 606 is positioned and guided within a rigid tube 612, such that the cable 606 is capable of sliding within the tube 612. The tube 612 has a greater column strength and lower flexibility than the cable 606 such that the tube 612 does not bend, deform, or deflect in response to sliding movement of the cable 606. The tube 612 effectively routes the cable 606 between the link 512 and the bearing 502. Each end of the tube 612 is mounted to a bracket 614 that is fixed to a stationary point on the frame member 508 or the header. The tube 612 remains stationary during movement of the cable 606. According to a different example not disclosed herein, the tube 612 may be replaced by a series of rollers along which the cable 606 is routed.

In use, adjusting the position of the fasteners 522 changes the tension on conveyor belt 126. For example, moving the fasteners 522 further toward frame member 508 (in the direction of arrow 623) causes compression of spring 520, which causes the link 512 to translate in the direction of arrow 624, which increases the tension on the cable 606, which linearly pulls the second end 610 of cable 606 in the direction of arrow 626, which causes bearing 502 and shaft 131 to move in the direction of arrow 626. Movement of shaft 131 in the direction of arrow 626 increases the tension on conveyor belt 126. As compared with the linkage 506 shown in FIG. 5, the cable 606 imparts even less of a bending moment (if any) to the bearing 502. Stated differently, the cable 606 imparts no bending moment to the bearing 502.

Conversely, moving the fasteners 522 further away frame member 508 (in the direction of arrow 624) causes expansion of spring 520, which causes the link 512 to translate in the direction of arrow 623, which decreases the tension on the cable 606, which allows the bearing 502 and shaft 131 to move in the direction of arrow 628. Movement of shaft 131 in the direction of arrow 628 decreases the tension on conveyor belt 126.

Figure 7:
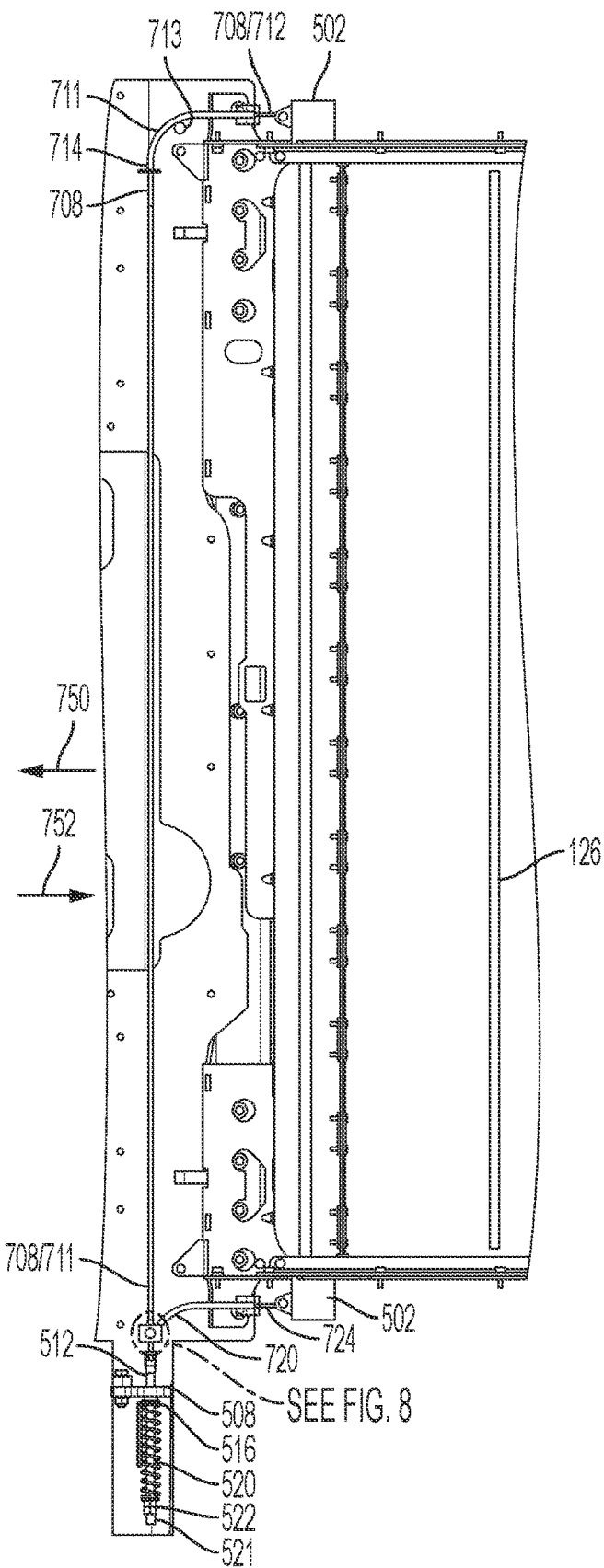
FIG. 7 is a partial schematic top plan view of a header according to a third example.
Figure 8:
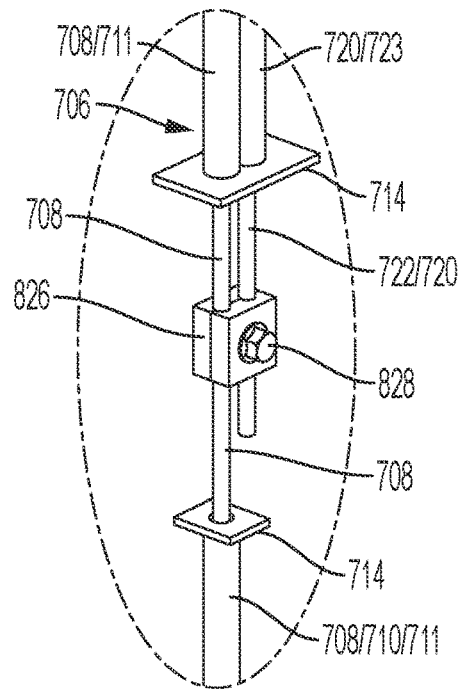
FIG. 8 is a detailed view of the header of FIG. 7.

FIG. 7 is a partial schematic top plan view of a header according to a third example, and FIG. 8 is a detailed view of the header shown in FIG. 7. Turning now to those figures, the header of FIG. 7 is substantially similar to the header of FIG. 6 with the exception that the cable is a cable assembly 706 that is connected to both sides of the bearing 502. More particularly, the cable assembly 706 includes a first cable 708 that extends between two ends 710 and 712. The first end 710 of the cable 708 is fixed to the link 512 and the second end 712 is fixed to a flange on the far side of the bearing 502 (like that described above with respect to FIG. 6). The cable 708 is positioned and guided within a series of tubes 711 (like the tube 612 described above), such that the cable 708 is capable of sliding within the tubes 711. Each end of each tube 711 is mounted to a bracket 714, which is fixed to a stationary point on the frame member 508 or the header. Like the example described above, the tubes 711 may be replaced by a series of rollers along which the cable 708 is routed.

The cable assembly 706 also includes a second cable 720 that extends between two ends 722 and 724. The first end 722 of the cable 720 is fixed to a three-piece block assembly 826 and the second end 724 is fixed to a flange on the near side of the bearing 502 (i.e., near block assembly 826). The cable 722 is positioned and guided within a tube 723 (like the tube 612 described above), such that the cable 720 is capable of sliding within the tube 723. Each end of each tube 723 is mounted to a bracket 714, which is fixed to a stationary point on the frame member 508 or the header.

The three-piece block assembly 826 comprises two mating half-blocks each having two channels for accommodating the rounded exterior surface of the cables 708 and 720. The half-blocks are fixed together by a fastener 828 (comprising the third piece of the block 826). The block assembly 826 fixes the cables 708 and 720 together such that the cables do not slide relative to each other. The three-piece block assembly 826 is adjustable for adjusting the tension on the second cable 720 relative to the tension on the first cable 708.

In use, adjusting the position of the fasteners 522 changes the tension on conveyor belt 126. For example, moving the fasteners 522 further toward frame member 508 causes compression of spring 520, which causes the link 512 to translate in the direction of frame member 508, which increases the tension on both cables 708 and 720, which causes both ends of the bearing 502 and its shaft 131 to move in the direction of arrow 750. Movement of shaft 131 in the direction of arrow 750 increases the tension on conveyor belt 126. As compared with the cable 606 shown in FIG. 6, the cable assembly 706 imparts even less of a bending moment (if any) to the bearing 502 because the cable assembly 706 is fixed to both ends of the shaft 131 (via bearings 502). Stated differently, the cable assembly 706 imparts no bending moment to the bearing 502.

Conversely, moving the fasteners 522 further away frame member 508 causes expansion of spring 520, which causes the link 512 to translate away from the frame member 508, which decreases the tension on the cable assembly 706, which allows the bearing 502 and shaft 131 to move in the direction of arrow 752. Movement of shaft 131 in the direction of arrow 752 decreases the tension on conveyor belt 126.

Figure 9:
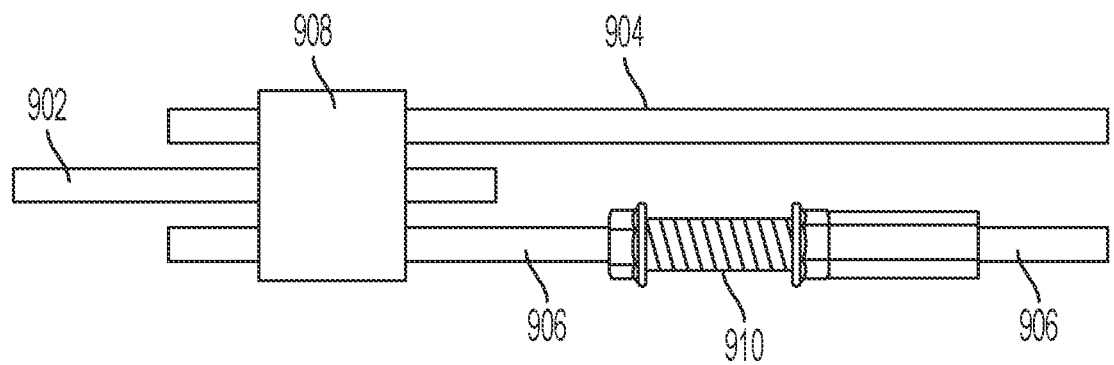
FIG. 9 depicts a cable assembly for use with the header shown in FIG. 7 and according to a fourth example.

Turning now to FIG. 9, a different cable assembly is shown for use with the header shown in FIG. 7. The cable assembly is configured for adjusting the tension of the belt 126. The cable assembly shown in FIG. 9 includes a first cable 902 that is configured to be fixedly connected to the link 512, a second cable 904 that is configured to be fixedly connected to one side of the bearing 502, and a third cable 906 that is configured to be fixedly connected to an opposite side of the bearing 502. A block assembly 908, like the block assembly 826, is employed for fixing all three cables together. An adjustment mechanism 910, in the form of a male fastener (threaded stud) that is adjustably fixed to a female fastener (threaded socket), is fixed to the cable 906.

More particularly, the cable 906 is divided into two segments, i.e., one cable segment extending between the block assembly 908 and the adjustment mechanism 910 and another cable segment extending between the adjustment mechanism 910 and the bearing 502. It is possible to adjust the adjustment mechanism 910 for changing the tension on the cable 906 (and consequent adjustment on the bearing 502). The adjustment mechanism 910 may vary from that shown and described. Other adjustment mechanisms 910 are envisioned such as a turnbuckle, a pin/slot arrangement, fastener, clamp, or a latch, for example.

Figure 10:
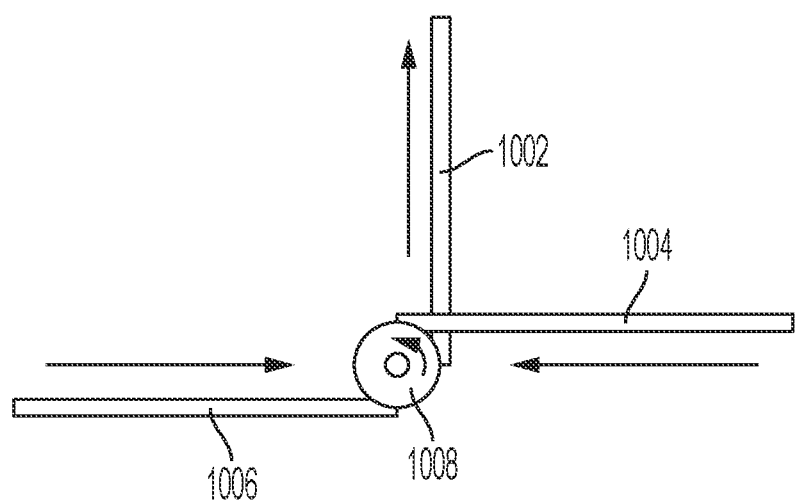
FIG. 10 depicts another cable assembly for use with the header shown in FIG. 7 and according to a fifth example.

FIG. 10 depicts another cable assembly for use with the header shown in FIG. 7 and for adjusting the tension of the belt 126. The cable assembly shown in FIG. 10 includes a first cable 1002 that is configured to be fixedly connected to the link 512, a second cable 1004 that is configured to be fixedly connected to a bearing 502 on one side of the shaft 131, and a third cable 1006 that is configured to be fixedly connected to a bearing 502 on an opposite side of the shaft 131. The cables 1002, 1004 and 1006 each have an end that is fixed to a spool 1008. The spool 1008 can be mounted to a fixed point on the header, such as the frame member 508. The spool 1008 is configured to rotate about its axis (see curved arrow).

In use, when the cable 1002 is pulled away from the spool 1008 (i.e., in the direction of the arrow) by adjusting the position of the fasteners 522 (as described above), for example, the spool 1008 rotates in a counterclockwise direction, which causes the cables 1004 and 1006 to wind on the spool 1008, thereby increasing the tension on the belt 126. Conversely, when the cable 1002 is permitted to wind on the spool 1008 (by virtue of the force of spring 520), the spool 1008 rotates in a clockwise direction, which causes the cables 1004 and 1006 to unwind from the spool 1008, thereby decreasing the tension on the belt 126.

Described herein are means for moving the link 512 that are directly connected to said link 512. The means may comprise the fasteners 522, or any other mechanism that can be employed to move a link. For example, and although not shown, a hydraulic motor, electric motor or other motive device could be configured to move the link 512 to adjust the tension of the conveyor belt 126. Stated different, the means may be configured to moving the cables 606, 708, 902, 1002.

In light of all the foregoing, it should thus be apparent to those skilled in the art that there has been shown and described a device for adjusting the tension of an infeed belt of a header of a combine harvester. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A header for a combine harvester comprising:
a conveyor belt for conveying crop material in a conveyance direction; and
an adjusting device for adjusting a tension of the conveyor belt, the adjusting device comprising a cable that is movable with respect to a frame member of the header, wherein a first attachment portion of the cable is either directly or indirectly attached to one end of a roller for the conveyor belt, and wherein the first attachment portion extends either parallel to or substantially parallel to a tensioning direction of the conveyor belt for adjusting the tension of the conveyor belt,
wherein the cable is connected to a shaft that is biased by a spring to maintain the conveyor belt in a state of tension, wherein the spring is positioned against the frame member.

2. The header of claim 1, wherein a second attachment portion of the cable, which is defined on the cable at a location opposite the first attachment portion, extends either orthogonal or substantially orthogonal to the tensioning direction of the conveyor belt.

3. The header of claim 1, wherein the tensioning direction and a conveyance direction of the conveyor belt are both in a fore-aft direction of the combine harvester.

4. The header of claim 1, further comprising a fastener mounted to the shaft for adjusting a compression of the spring, which consequently adjusts the state of tension of the conveyor belt.

5. The header of claim 1, further comprising a rigid tube in which the cable is positioned, wherein the rigid tube is fixed to the frame member.

6. The header of claim 1, further comprising rollers mounted to the frame member for guiding movement of the cable.

7. The header of claim 1, wherein the conveyor belt is an infeed conveyor belt and the header is a draper header.

8. The header of claim 7, wherein the infeed conveyor belt is oriented orthogonal to a lateral conveyor belt of the draper header.

9. The header of claim 1, wherein a conveyance direction of the conveyor belt is toward a feederhouse.

10. The header of claim 1, wherein the conveyor belt is a lateral conveyor belt and the header is a draper header.

11. The header of claim 1, further comprising means for moving the cable.

12. A combine harvester or other agricultural machine comprising the header of claim 1.

13. A header for a combine harvester comprising:
a roller;
a conveyor belt mounted to the roller for conveying crop material in a conveyance direction; and
an adjusting device for adjusting a tension of the conveyor belt, the adjusting device comprising a cable assembly that is movable with respect to a frame member of the header, the cable assembly comprising a first cable and a second cable,
wherein a first attachment portion of the first cable of the cable assembly is either directly or indirectly attached to one end of the roller,
wherein a first attachment portion of the second cable of the cable assembly is either directly or indirectly attached to an opposite end of the roller, and
wherein the first attachment portions each extend either parallel to or substantially parallel to a tensioning direction of the conveyor belt for adjusting the tension of the conveyor belt.

14. The header of claim 13, further comprising a means for adjusting a length of the first cable.

15. The header of claim 13, wherein the first and second cables are fixed together at at least one location along the length of the cables.

16. The header of claim 13, further comprising a spool that is rotatably mounted to a stationary point on the header, and wherein the first and second cables are fixedly attached to the spool, and further comprising a third cable fixed to the spool, wherein rotation of the spool caused by movement of the third cable results in either winding or unwinding of the first and second cables on the spool, which adjusts the tension of the conveyor belt.

17. The header of claim 13, wherein a second attachment portion of the first cable is disposed opposite the first attachment portion of the first cable, a second attachment portion of the second cable is disposed opposite the first attachment portion of the second cable, and wherein the second attachment portions are either directly or indirectly connected to a shaft that is biased by a spring to maintain the conveyor belt in a state of tension.

18. A header for a combine harvester comprising:
- a conveyor belt for conveying crop material in a conveyance direction;
- an adjusting device for adjusting a tension of the conveyor belt, the adjusting device comprising a cable that is movable with respect to a frame member of the header, wherein a first attachment portion of the cable is either directly or indirectly attached to one end of a roller for the conveyor belt, and wherein the first attachment portion extends either parallel to or substantially parallel to a tensioning direction of the conveyor belt for adjusting the tension of the conveyor belt; and
- rollers mounted to the frame member for guiding movement of the cable.

* * * * *